United States Patent
Tsubata et al.

(10) Patent No.: US 6,794,062 B2
(45) Date of Patent: Sep. 21, 2004

(54) MAGNETIC TRANSFER MASTER MEDIUM

(75) Inventors: Hisashi Tsubata, Kanagawa-ken (JP); Makoto Nagao, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/051,015

(22) Filed: Jan. 22, 2002

(65) Prior Publication Data

US 2002/0098387 A1 Jul. 25, 2002

(30) Foreign Application Priority Data

Jan. 22, 2001 (JP) .................. 2001-012671
Jan. 22, 2001 (JP) .................. 2001-012688
Feb. 22, 2001 (JP) .................. 2001-046633

(51) Int. Cl.[7] .............. B32B 9/00; G11B 5/66; G11B 5/86; G11B 21/02
(52) U.S. Cl. .............. 428/692; 428/694 SG; 428/694 TR; 360/15; 360/16; 360/17; 360/75; 360/55; 360/135
(58) Field of Search .............. 360/15, 16, 17, 360/75, 135, 55; 428/692, 694 SG, 694 TR

(56) References Cited

U.S. PATENT DOCUMENTS 5,324,582 A * 6/1994 Goto et al. .......... 428/323

FOREIGN PATENT DOCUMENTS

| EP | 0 915 456 A1 | 5/1999 | |
|----|----|----|----|
| EP | 0915456 A1 | 5/1999 | |
| EP | 1 187 109 A2 | 3/2002 | |
| JP | 61-230606 | * 10/1986 | .......... G11B/5/127 |
| JP | 2000-163730 | * 10/1986 | .......... G11B/5/66 |
| JP | 10-40554 | 2/1998 | |
| JP | 10-269566 | 10/1998 | |
| JP | 11-161956 | 6/1999 | |
| JP | 2001-49007 | * 2/2001 | .......... C09J/5/18 |

OTHER PUBLICATIONS

Derwent DWPI Online abstract Accession No. 2001–414691/44 *JP 2001134937*, A (Matsuhita Denki Sangyo KK) May 18, 2001.

Derwent DWPI Online abstract Accession No. 2001–414689144 *JP 2001134935*, A (Matsushita Denki Sangyo KK) May 18, 2001.

* cited by examiner

*Primary Examiner*—Deborah Jones
*Assistant Examiner*—G. Blackwell-Rudasill
(74) *Attorney, Agent, or Firm*—Sughrue Mion, PLLC

(57) ABSTRACT

In the performance of a magnetic transfer utilizing a magnetic transfer master medium, the occurrence of signal omissions in the magnetic data transferred to the slave medium is prevented. By forming the protrusion portions of the uneven pattern formed on the surface of the master medium so that the width thereof in the direction of the track pitch is narrower than said track width, no depression portions that are surrounded on all four sides by protrusion portions are formed.

11 Claims, 13 Drawing Sheets

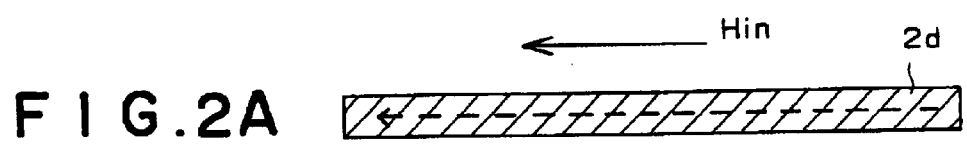
F I G. 2A
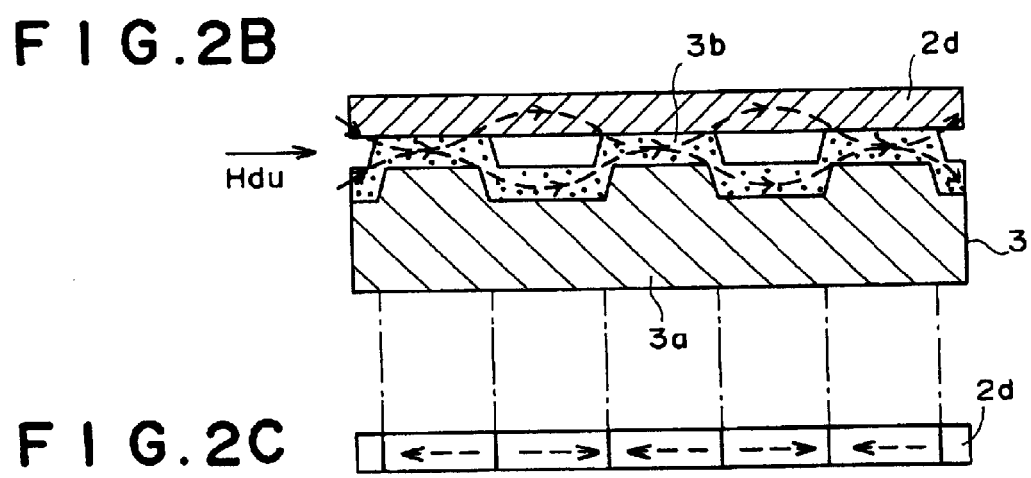
F I G. 2B
F I G. 2C

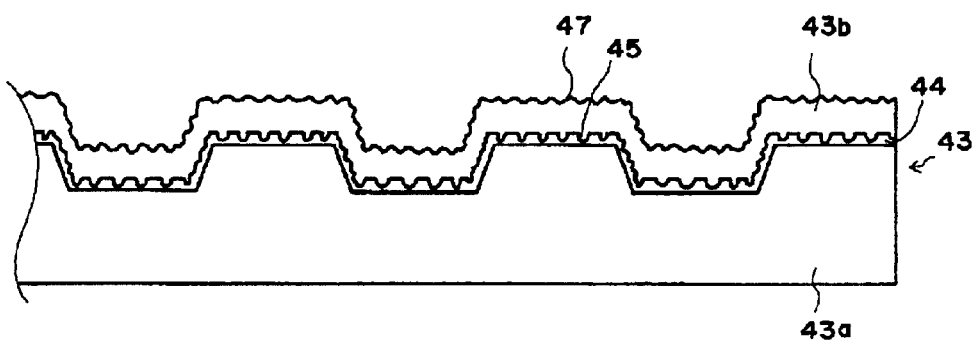
F I G . 10

MAGNETIC TRANSFER MASTER MEDIUM

BACKGROUND OF THE INVENTION

1. Field of the Invention

The present invention relates to a magnetic master transfer medium provided with an uneven pattern for transferring data to a slave medium, and the usage method thereof.

2. Description of the Related Art

Generally speaking, with regard to magnetic storage mediums, those having a high storage capacity to record an increasing amount of data are desired. More preferably, so-called high-speed access mediums capable of advantageously reading out the data of a desired location in a short time are desired. One example of these mediums is the high density magnetic disk medium employed in hard disk or flexible disk apparatuses; so-called tracking servo technology, wherein the magnetic head accurately scans a narrow width track to achieve a high S/N ratio, plays a substantial role in realizing the high storage capacity thereof. A servo signal, address data signal, replay clock signal, etc., used for tracking within a certain interval occurring in one rotation of the disk are recorded in advance in a so-called preformatting, and the magnetic head is set so as to be capable of reading out the preformatted signals and correcting its position thereby, whereby the magnetic head can accurately scan the track.

In general, the servo signal (the servo pattern) is formed in the following order from the starting position of the servo frame: a preamble (a concurrent use signal), a gray code (the track number signal), and a burst signal (the signal determining the head position), and a data region follows thereafter. A portion of the burst signal is recorded at a distance displaced by ½ the width of the track from the center line of said track, and the remaining components of the servo signal are recorded on the center line of the track at an entire track pitch width. Further, the data region is narrower than the recording width of the servo signal, and a guard band portion is formed at the portions adjoining the inner and outer tracks thereto, which prevents the recording of a signal thereon.

At present, a preformat such as that described above employs a specialized servo recording apparatus, and is formed by writing the signal for one disk at a time, on one track at a time. The servo recording apparatus is provided with a magnetic head, which has a head width of, for example, 75% of the track pitch, and first rotates the disk one rotation with the magnetic head disposed adjacent to the disk; the pattern corresponding to the outer ½ track is written, after which the magnetic head is moved ½ track pitch inward and the pattern corresponding to the inner ½ track is written during the next rotation of the disc, whereby a one track portion of signal is written.

The servo recording apparatus described above is of high cost, and because a significant amount of time is required for the preformatting operation, this process accounts for the larger part of the manufacturing costs; reducing these costs is desirable.

In this regard, methods wherein the preformat data is transferred by a magnetic transfer, which is a method by which preformat data is not written one track at a time, has been proposed: for example, magnetic transfer technologies are introduced in Japanese Unexamined Patent Publication Nos. 10(1998)-269566, 10(1998)-40544, etc. According to the magnetic transfer of these methods: a master medium having an uneven pattern corresponding to the data to be transferred to the slave medium, which is a magnetic transfer medium such as a magnetic disk or the like, is prepared; this master medium is brought into a state of close contact with the slave medium; then, by applying a transfer magnetic field, the magnetic pattern corresponding to the data carried by the uneven pattern (e.g., a servo signal) of the master medium is transferred to the slave medium; the preformatting can be performed without changing the relative positions of the master medium and the slave medium, that is, while the two media remain stationary; and not only is it possible to perform an accurate recording of the preformat data, it becomes possible to do so in an extremely short time.

In order to improve the transfer quality of a magnetic transfer such as that described above, it is important that the master medium and the slave medium be disposed in close contact with each other in a manner wherein there is no gap therebetween. That is to say, if the two media are not properly brought into close contact with each other, regions in which the magnetic transfer is not effected occur, and signal omissions occur in the magnetic data transferred to a slave medium onto which the transfer has not been properly effected, producing a decrease in the signal quality thereof; for cases in which the recorded signal is a servo signal, a problem arises in that the tracking function is insufficient, resulting in a decrease in reliability.

To solve this problem, technologies have been proposed, in, see for example, Japanese Unexamined Patent Publication No. 11(1999)-161956, wherein the center portion of the master medium is formed as a curved protrusion, with respect to the slave medium, and when the master and slave mediums are brought into contact, the surface of the master medium deforms to become progressively flatter from the center portions thereof toward the periphery due to the pressure exerted thereon, and they are brought into close contact in a manner so that no air remains between two surfaces thereof, whereby the contact characteristics therebetween are improved.

However, in order to facilitate the transferal to the slave medium the same signal pattern servo written to the slave medium when the servo recording apparatus described above is employed, the uneven pattern formed on the master medium is formed by protrusions and depressions of a width equivalent to the track pitch (the track width) of the slave medium. More specifically, as shown in the partial perspective view of the form of the uneven pattern formed on the surface of the master medium illustrated in FIG. 13, the protrusion portion 71, which has a width in the direction of the track pitch (direction Y) equivalent to the width of the track pitch P, is formed within one track or straddling two tracks.

Because these types of protrusion portions 71 are formed contiguously in the in the direction of the track (direction X) and in the direction of the track pitch (direction Y), as shown by the diagonal lines within FIG. 13, there are cases in which a depression portion 72 is formed surrounded on all four sides by protrusion portions 71. If there are depression portions 72 of this type, that is, which are surrounded on four sides by protrusion portions 71, even if a technology of the type proposed in the aforementioned Japanese Unexamined Patent Publication No. 11(1999)-161956 for improving the contact characteristics between the surface of the master medium and the surface of the slave medium is employed, in actuality, when the master medium and the slave medium are brought into close contact, the protrusion portions 71 surrounding the depression portion 72 end up being brought into close contact with the slave medium first and the air held in the thus closed off depression portion 72 is not removed, whereby a problem arises in that adequate contact characteristics cannot be obtained as a result of this air remaining within the space of the closed off depression portion 72.

Further, because the magnetic transfer is performed in the state wherein the master and slave mediums have been brought into close contact as described above, cases occur in which the position determining of the master medium and the slave medium is performed while they are in the close contact state before the magnetic transfer is performed, and due to the friction generated by the rubbing together of the respective contact surfaces of the master medium and the slave medium during this position determining, the surface form of the pattern bearing the data of the master medium is worn away after repeated performance of the magnetic transfer, whereby the accuracy of the transfer is deteriorated. It is necessary to replace the master medium if the surface form of the pattern bearing the data thereof is worn away and the accuracy of the magnetic transfer thereby reduced; because the cost of the master medium is extremely high, the problem regarding how many slave mediums a single master medium can be used to transfer to is extraordinarily important in relation to controlling manufacturing costs.

Meanwhile, if there is even one portion between the master medium and the slave medium that has poor contact when said two mediums are brought into close contact, the positional relation between both of said mediums cannot be maintained across the entirety of the respective surfaces thereof, and the transfer quality is reduced. Also, according to the specific circumstances, there are cases in which regions to which the transfer has not been effected appear due to poor contact between the two mediums, and signal omissions occur in the magnetic data transferred to a slave medium onto which the transfer has not been properly effected, producing a decrease in the signal quality; for cases in which the recorded signal is a servo signal, a problem arises in that the tracking function is insufficient, resulting in a decrease in reliability.

SUMMARY OF THE INVENTION

The present invention has been developed in view of the foregoing circumstances, and it is a primary object of the present invention to provide a master medium capable of effecting a high quality magnetic transfer to a slave medium, wherein no signal omissions occur in the magnetic data transferred thereto.

It is a further object of the present invention to provide a long-life magnetic transfer master medium capable of transferring magnetic data to a larger number of slave mediums.

The magnetic transfer master medium according to the present invention is a magnetic transfer master medium that is provided with an uneven surface for transferring data to a slave medium, wherein the uneven pattern is formed so that there are no depression portions therein that are completely surrounded by protrusion portions.

The phrase "formed so that there are no depression portions therein that are completely surrounded by protrusion portions" means that the uneven pattern is formed so that there is at least one portion on the immediate periphery of each depression portion, through which air can be expelled when the master and the slave medium are brought into close contact; for example, the width of the protrusion portions in the direction of the track pitch of the uneven pattern can be formed so as to be narrower than said track pitch.

Note that it is not necessary that the width of all of the protrusions portions be formed so as to be narrower than said track pitch; it is permissible that only a portion of the protrusion portions be formed so that the width thereof in the direction of the track pitch is narrower than said track pitch. In this case, the uneven pattern can be of a configuration wherein, for example, the protrusion portions formed within a single track can be formed so that the width thereof in the direction of the track pitch is narrower than said track pitch; also, the protrusion portions formed so as to straddle adjacent tracks can be formed so that the width thereof in the direction of the track pitch is substantially equal to said track pitch.

Another magnetic transfer master medium according to the present invention is a magnetic transfer master medium that is provided with an uneven surface for transferring data to a slave medium, wherein a rough surface is formed on the surface of the protrusion portions of the uneven pattern.

Note that the rough surface formed on the surface of the protrusion portions of the uneven pattern can be formed on a portion or the entirety thereof. Further, the rough surface is not limited to being capable of being formed on the protrusion portions; no problem is incurred if the rough surface is formed on the surface of the depression portions as well.

More specifically, the magnetic transfer master medium described above comprises, for example, a substrate, and an uneven pattern provided thereon, which is provided with a pliable magnetic layer formed on at least the sections constituting the protrusion portions thereof; wherein, the rough surface corresponds to a rough surface formed, by use of a surfacing process, on at least the sections of the substrate on which the pliable magnetic layer has been provided. Here, as to the surfacing process to which the substrate is subjected, a process such as a texturing process performed by grinding or a texturing process performed by use of a laser can be employed, or alternatively, a process that causes erosion on the surface, may be employed.

Further, the magnetic transfer master medium according to the present invention may comprise a substrate, a granular material coated onto the sections of the uneven pattern formed on said substrate that constitute at least the protrusion portions thereof, and a pliable magnetic layer formed on said granular substance; wherein, the rough surface is formed according to the surface form of the protrusion portions coated with the granular material.

Still further, the aforementioned other magnetic transfer master medium according to the present invention comprises a substrate, and an uneven pattern formed thereon, which is provided with a pliable magnetic layer formed on at least the sections constituting the protrusion portions thereof; wherein, the rough surface can be formed according to the formation conditions of the pliable magnetic layer, that is, can be formed as a surface roughness controlled by the sputtering conditions or the like, for example.

In addition, yet another magnetic transfer master medium according to the present invention comprises a substrate, an uneven pattern formed thereon, which is provided with a film of porous material on at least the sections constituting the protrusion portions thereof, and a pliable magnetic layer formed on the film of porous material; wherein, the rough surface can be formed according to the surface form of the film of porous material. In this case, it is desirable that the film of porous material have a volume ratio in the range of 30–99%, and a surface roughness in the range of Rp=0.0001 to 0.1.

Note that according to the magnetic transfer master medium described above, it is desirable that the rough surface is an uneven surface having depression portions of a depth in the 3–50 nm range; and it is more preferable that said depth be in the 5–20 nm range.

Yet another magnetic transfer master medium according to the present invention is a magnetic transfer master medium provided with an uneven surface for transferring data to a slave medium; wherein, the channels of the uneven pattern are of a depth in the 50–1000 nm range immediately after the manufacture of said medium, and the surface of the protrusion portions is ground at least once after the manufacture and before the use of said medium, and then the medium is used.

Further, yet still another magnetic transfer master medium according to the present invention is a magnetic transfer master medium provided with an uneven surface for transferring data to a slave medium; wherein, the channels of the uneven pattern are of a depth in the 50–1000 nm range immediately after the manufacture of said medium, and the surface of the protrusion portions is ground at least once after said medium has been used, and then said medium is reused.

The phrase "immediately after the manufacture" refers to the master medium in the state occurring after a series of manufacturing processes has been completed and the medium is capable of being used for performing magnetic transfer, and the medium has not yet been used. Accordingly, in general, during the course of carrying out manufacturing processes to make a magnetic transfer master medium, a grinding process, for example, is performed for cases such as those in which burrs are present on the surface of the protrusion portions of the uneven pattern, or the like; this grinding process differs from the grinding process described above.

Further, the referents of "after the manufacture and before the use of said medium" can include the state immediately after the manufacture of the medium has been completed and before it has been used, and the state occurring after the medium has been used once and before the medium has been reused.

The method of using the magnetic transfer master medium according to the present invention is a method of using a magnetic transfer master medium provided with an uneven surface for transferring data to a slave medium; wherein, said magnetic transfer master medium is used after the surface of the protrusion portions of the uneven pattern has been ground at least once immediately after the manufacture of said medium.

Further, another method of using the magnetic transfer master medium according to the present invention is a method of using a magnetic transfer master medium provided with an uneven surface for transferring data to a slave medium; wherein, said magnetic transfer master medium is reused after the surface of the protrusion portions of the uneven pattern has been ground at least once after said master medium has been used.

Still further, each of the above-described methods of using the magnetic transfer master medium according to the present invention can be a method wherein the surface of the protrusion portions of the uneven pattern formed on the magnetic transfer master medium is ground according to the extent to which said surface is marred.

Here, the phrase "ground according to the extent to which said surface is marred" can refer to the performance of the grinding of the surface of the protrusion portions of the uneven pattern based on a predetermined number of times or a predetermined number of days which the medium has been used, or based on an inspection of the surface form of the surface of said protrusion portions.

According to the magnetic transfer master medium of the present invention, because the uneven pattern has been formed so that there are no depression portions that are surrounded by protrusion portions on all four sides, the problem occurring when a conventional magnetic transfer master medium is used, as described above, wherein air remains in the depression portions surrounded on all four sides by protrusion portions when the master and slave mediums are brought into close contact and the contact property between the respective surfaces has been thereby deteriorated, can be avoided, and the contact property between the master and slave mediums can be improved. By improving the contact property between the master and slave mediums, signal omissions can be prevented, and the quality of the transferred signal can be improved.

According to another magnetic transfer master medium of to the present invention, because a rough surface has been formed on the surface of the protrusion portions of the uneven pattern, which is brought into contact with the slave medium, compared to the case in which the surface of the protrusion portions of a conventional magnetic transfer master medium is brought into contact with a slave medium, because the actual surface area with which the surface of the slave medium is brought into contact can be made smaller, the coefficient of the friction, in particular, that occurring between said two surfaces during the performance of the position determining thereof when both of said surfaces are brought into close contact can be lowered; as a result, the wear-out period of the uneven pattern can be extended. Accordingly, the life span of the master medium can be lengthened, whereby it becomes possible to transfer data to a larger number of slave mediums. Therefore, the costs incurred in performing magnetic transfer can be reduced, and preformatted slave mediums can be provided at a low cost.

Further, after the slave medium has been brought into close contact with the master medium and the transfer has been effected, there are cases in which it is difficult to peel the slave medium from the master medium, and it becomes necessary to apply an excessive amount of force to effect the separation thereof; although this excessive force is sometimes the cause of damage to the mediums, according to the present invention, if the actual contact surface area between said two mediums is small, an effect is produced whereby one potential cause of damage to said mediums is eliminated.

Still further, by forming a rough surface, because it becomes easy to remove air when the slave medium is brought into close contact with the master medium, the contact characteristics between the respective surfaces of the master and the slave medium can be improved. By improving these contact characteristics, the occurrence of signal omissions can be prevented, and the recording quality of the transferred signal can be improved.

According to yet another magnetic transfer master medium of the present invention, because the surface of the protrusion portions of the uneven pattern formed on said medium magnetic transfer master medium is ground at least once after the manufacture thereof and before said medium is used, even if the surface of said protrusion portions is marred, the marks thereon can be removed by the grinding process and the medium can be provided for use having a desirable surface state.

According to still yet another magnetic transfer master medium of the present invention, because the surface of the protrusion portions of the uneven pattern formed thereon is ground at least once after said medium has been used, and then said medium is reused, even if the surface form of said protrusion portions is worn due to usage, or has been marred by dust or other foreign matter that has adhered thereto, the surface state can be restored by the grinding process and the medium can be made available for reuse having a desirable surface state.

According to the method of using the magnetic transfer master medium according to the present invention, because the magnetic transfer master medium is used after the surface of the protrusion portions of the uneven pattern formed thereon has been ground at least once immediately after the manufacture of said medium, even for cases in which the surface of said protrusion portions is marred, said medium is used after said marks have been removed by the grinding process, whereby it becomes possible to obtain a high quality magnetic transfer. Further, in this way, the master medium can be used repeatedly; as a result, the life span of the master medium can be lengthened, whereby it becomes possible to transfer magnetic data therefrom to a larger number of slave mediums. Accordingly, the cost incurred in the magnetic transfer operation can be cut, whereby it becomes possible to provide preformatted slave mediums at a lower price.

Further, according to another method of using the magnetic transfer master medium according to the present invention, because said magnetic transfer master medium is reused after the surface of the protrusion portions of the uneven pattern has been ground at least once after said medium has been used, even for cases in which the surface state of said protrusion portions is worn out due to usage, and including cases in which said surface state has been marred by dust or other foreign matter that has adhered thereto, said medium is used after said marks have been removed and the surface state thereof has been restored by the grinding process, whereby it becomes possible to obtain a high quality magnetic transfer. Further, in this way, the master medium can thereby be used repeatedly; whereby the life span of the master medium can be lengthened, and the and it becomes possible to transfer magnetic data therefrom to a larger number of slave mediums. Accordingly, the cost incurred in the magnetic transfer operation can be cut, whereby it becomes possible to provide preformatted slave mediums at a lower price.

BRIEF DESCRIPTION OF THE DRAWINGS

FIGS. 2A, 2B, and 2C are drawings illustrating the basic processes of a magnetic transfer method, FIG. 10 is a drawing of a cross-section of a portion of the master medium of the sixth embodiment of the present invention.

DESCRIPTION OF THE PREFERRED EMBODIMENTS

Hereinafter, the preferred embodiments of the present invention will be described in detail with reference to the attached drawings. First, the basic processes of a magnetic transfer for transferring data by use of a master medium to a slave medium will be explained with reference to FIGS. 1 and 2.

Figure 1:
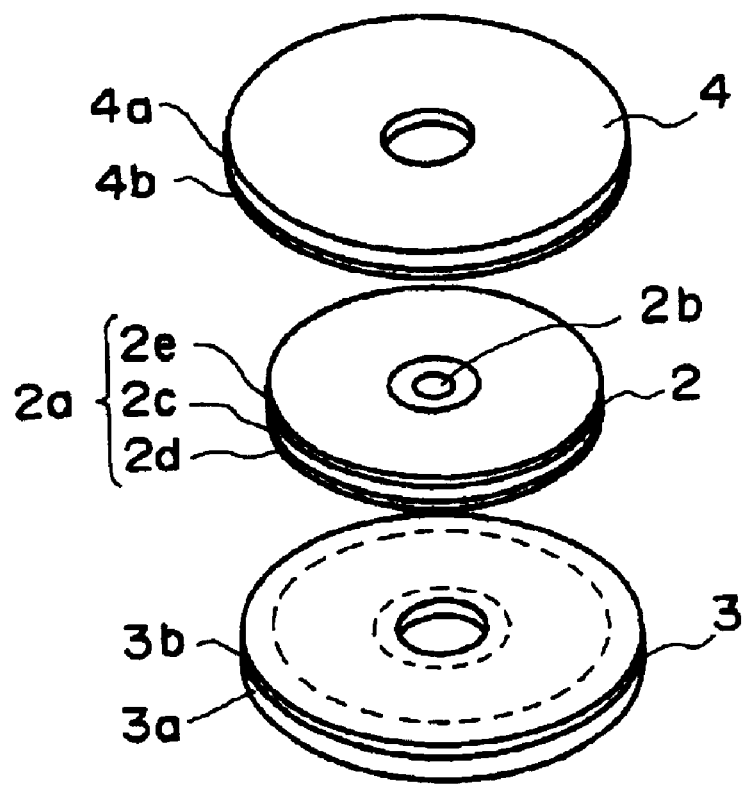
FIG. 1 is a drawing of a perspective view of a master medium and a slave medium.

FIG. 1 shows a perspective view of a slave medium 2 and master mediums 3 and 4. The slave medium 2 is, for example, a flexible disk, e.g., a disk shaped recording medium 2a having a hub 2b fixed at the center portion thereof, wherein the recording medium 2a comprises a disk shaped, non-magnetic base 2c formed of a flexible polyester sheet or the like, which has formed on both faces thereof a recording surface 2d and a recording surface 2e, respectively, which are each formed of a magnetic layer. Here, although a flexible disk has been used as an example, the slave medium is not limited thereto; the master medium according to the present invention can also be used for magnetically transferring data to a hard disk.

Further, each of the master mediums 3 and 4 are formed of a hard material as an annular disk, and is provided on one face thereof with a transfer data bearing surface on which has been formed a micro uneven pattern that is brought into close contact with the recording surfaces 2d and 2e of the slave medium 2. The master mediums 3 and 4 have an uneven pattern formed thereon corresponding to the lower recording surface 2d of the slave medium 2 and the upper recording surface 2e of the slave medium 2, respectively. Taking the master medium 3 as an example, the uneven pattern thereon is formed of the donut shaped region enclosed by the dotted line shown in FIG. 1. Note that although the master mediums 3 and 4 shown in FIG. 1 comprise respective substrates 3a and 4a on each of which an uneven pattern is formed, and pliable magnetic layers 3b and 4b formed on the uneven patterns, respectively, for cases in which the substrate 3a and the substrate 4a are formed of a ferromagnetic material such as Ni or the like, it is possible to perform the magnetic transfer by use of only the substrate; therefore, it is not necessarily required that the magnetic layers 3b and 4b (pliable magnetic layers) be provided. However, if a magnetic layer having good magnetic properties is provided, a higher quality magnetic transfer can be performed. Note that for cases in which the substrate is formed of a non-magnetic material, it is necessary that the magnetic layer be provided.

Still further, if a protective film such as Diamond-Like Carbon (DLC) or the like is coated on the top layer, this protective film improves the contact durability, enabling the performance of multiple magnetic transfers. Also, a silicon layer applied by a sputtering process or the like can be provided as an under layer of the DLC protective layer.

FIGS. 2A, 2B, and 2C are drawings illustrating the basic processes of the magnetic transfer method utilizing the master medium according to the present invention. FIG. 2A illustrates the process wherein a magnetic field is applied in one direction and the slave medium is initially magnetized with direct current magnetism. FIG. 2B illustrates the process wherein the master medium and the slave medium are brought into close contact and a magnetic field is applied in the direction opposite to that in which the initial magnetic field was applied. FIG. 2C illustrates the state after the magnetic transfer has been performed. Note that in FIGS. 2A, 2B, and 2C, as to the slave medium 2, only the lower face recording surface 2d thereof is shown.

The basic outline of the magnetic transfer method is as follows. A shown in FIG. 2A, first, an initial magnetic field Hin is applied to the slave medium 2 in one direction of the track direction; whereby the initial magnetization of the slave medium (direct current magnetization) is effected. Then, as shown in FIG. 2B, the recording surface 2d of the slave medium 2 and the transfer data bearing face of the master medium 3, which is the coated micro uneven pattern formed on the substrate 3a and coated with the magnetic layer 32, are brought into close contact, and a transfer magnetic field Hdu is applied in the track direction of the slave medium 2 opposite the direction in which the initial magnetic field Hin was applied, whereby the magnetic transfer is carried out. As a result, the data (a servo signal, for example) corresponding to the uneven pattern of the data bearing surface of the master medium 3 is magnetically transferred and recorded on the magnetic recording surface (the track) of the slave medium 2, as shown in FIG. 2C. Here, an explanation has been given for the lower face recording surface 2d of the slave medium and the lower master medium 3; however, as shown in FIG. 1, the upper face recording surface 2e and the upper master medium 4 are brought into close contact and the magnetic transfer is performed in the same manner. The magnetic transfer to the upper and lower face recording surfaces 2d and 2e of the slave medium 2 can be performed concurrently, or sequentially one face at a time.

Further, even for cases in which the uneven pattern of the master medium 3 is a negative pattern, the opposite to that of the positive pattern shown in FIG. 2B, by reversing the above described directions in which the initial magnetic field Hin and the transfer magnetic field Hdu are applied, the same data can be magnetically transferred and recorded. Note that as to the initial magnetic field and the transfer magnetic field, it is necessary that a value therefor be determined based on a consideration of the coercive magnetic force of the slave medium 2, and the relative magnetic permeability of the master and slave mediums.

Figure 3:
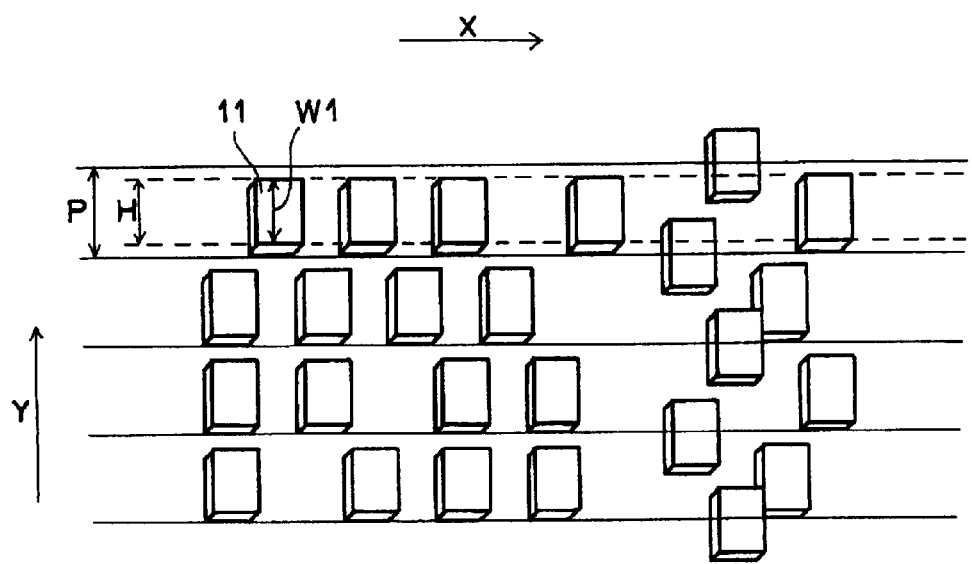
FIG. 3 is a drawing showing a perspective view of the surface form of a portion of the uneven pattern formed on the surface of the master medium of the first embodiment of the present invention.
Figure 4:
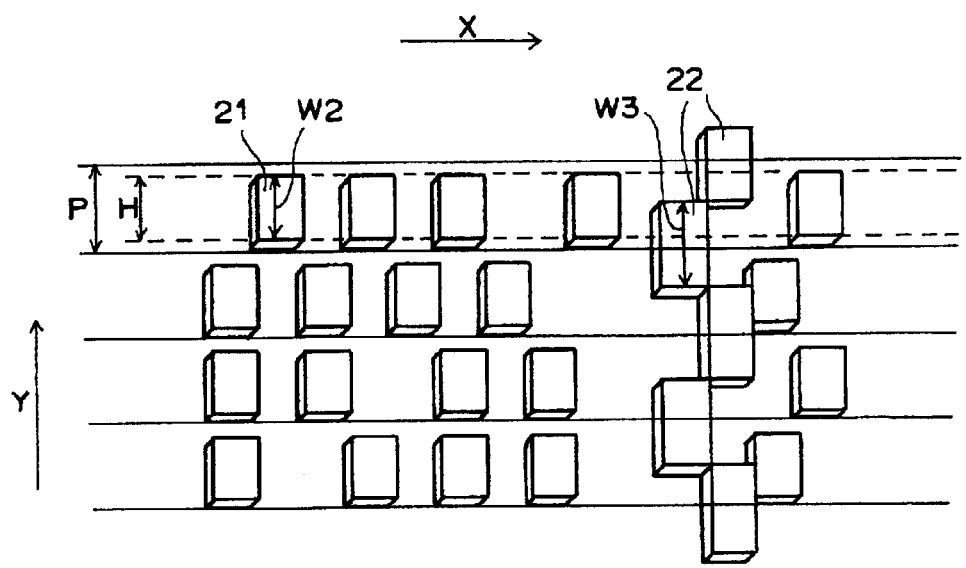
FIG. 4 is a drawing showing a perspective view of the surface form of a portion of the uneven pattern formed on the surface of the master medium of the second embodiment of the present invention.

Next the uneven pattern formed on the master mediums according to the embodiments of the present invention will be explained. FIGS. 3 and 4 show perspective drawings of a portion of the uneven pattern formed on the master mediums according to the first and second embodiments of the present invention.

Figure 13:
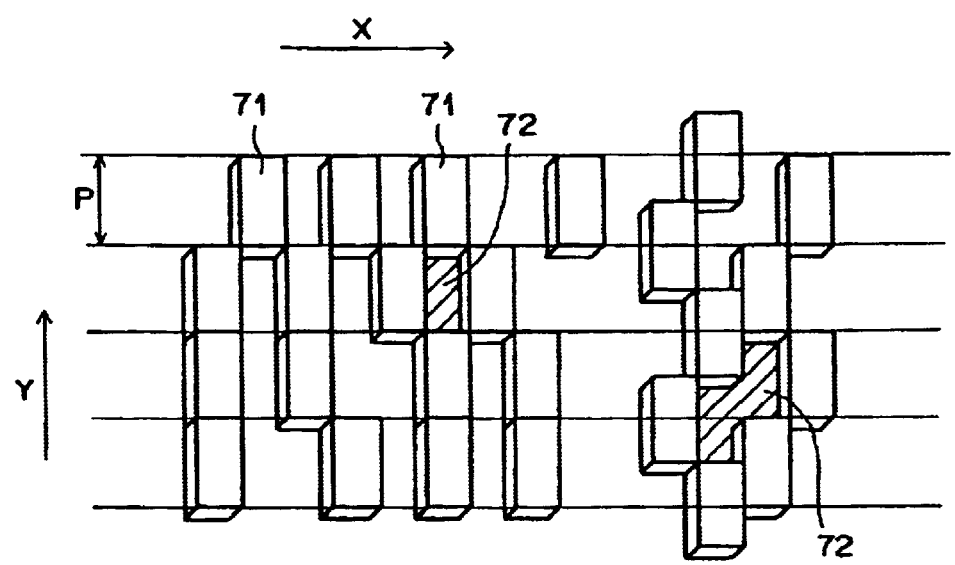
FIG. 13 is a drawing of a perspective view of the uneven pattern of a conventional master medium.

According to the uneven pattern formed on the master medium according to the first embodiment shown in FIG. 3, the width W1 in the direction of the track pitch of the protrusion portions 11 thereof is formed so as to be shorter that the track pitch P. Accordingly, the depression portion 72 surrounded by the protrusion portions occurring in the conventional uneven pattern shown in FIG. 13 is used is not present in the master medium shown in FIG. 3. By forming the protrusion portions smaller than the width occurring in the conventional pattern P, although a signal smaller in width than that occurring in the conventional pattern is formed on the track on the slave medium, if this width is the same as the width H of the magnetic head that reads out the signal of the slave medium, there is no deterioration of the C/N of the signal formed within a single track. However, within the formed pattern there are signals formed so as to straddle tracks (e.g., burst signals); regarding a signal on the slave medium corresponding to a protrusion portion that has been formed to straddle two tracks on the master medium, although a signal one half the width of a conventional magnetic head has been readout within a single track, because in the case of the current embodiment the width of the signal to be readout is smaller than one half the width W of the magnetic head, there is a possibility that the C/N will be deteriorated. However, the master medium according to the current embodiment has been improved so that the contact characteristics between said master medium and the slave medium are improved, whereby the occurrence of signal omissions due to contact deficiencies is suppressed, and the problem of a deterioration of the C/N of a portion of the signal is minor in comparison to that of a signal omission.

According to the uneven pattern formed on the master medium of the second embodiment shown in FIG. 4, regarding a protrusion portion 21, which is formed within a single track, each width W2 in the direction of the track pitch is formed so as to be shorter than each track pitch P; as to a protrusion portion 22, which is formed so as to straddle two tracks, the width W3 in the direction of the track pitch is formed so as to be substantially the same as the track pitch P. The reason that protrusion portions having different lengths have been formed in this manner is to suppress the deterioration in the C/N occurring in the form of the uneven pattern according to the first embodiment described above; according to the form of the uneven pattern according to the current embodiment shown in FIG. 4, deficiencies in the contact between the master medium and the slave medium do not occur, and the magnetic transfer can be carried out without incurring a deterioration of the C/N.

Note that the uneven pattern formed on the master medium according to the present invention is not limited to the uneven patterns occurring in the first and second embodiments described above; any pattern from among the conventional patterns wherein the positions at which depression portions surrounded by protrusion portions on all sides are made into a form in which a portion of one or more of the protrusion portions on the periphery of said surrounded depression portion is cut away so as to provide at least one portion on said periphery that is not a protrusion portion, thereby allowing the release of air therefrom, can be used.

Figure 5:
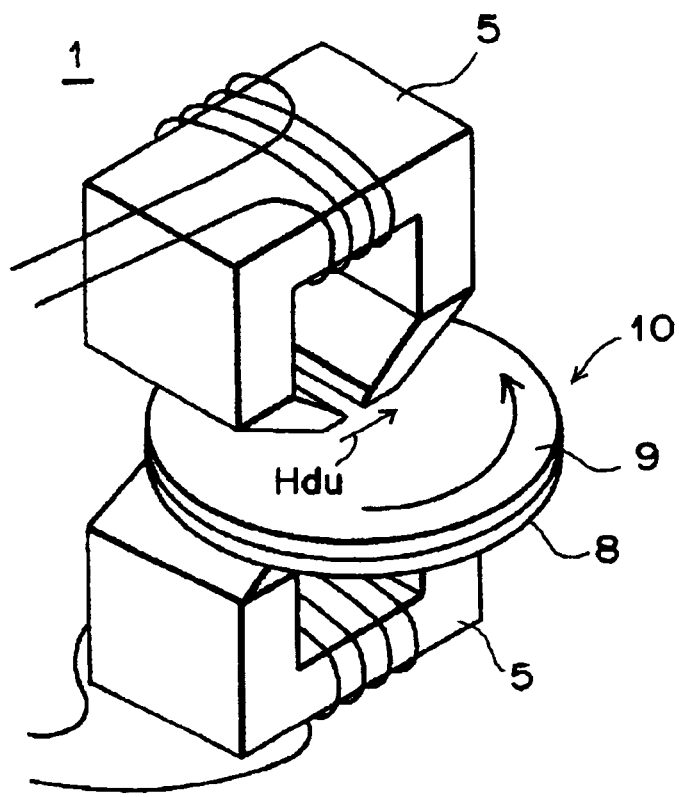
FIG. 5 is a perspective drawing showing the main sections of the magnetic transfer apparatus for performing a magnetic transfer utilizing the master medium according to one of the embodiments of the present invention.
Figure 6:
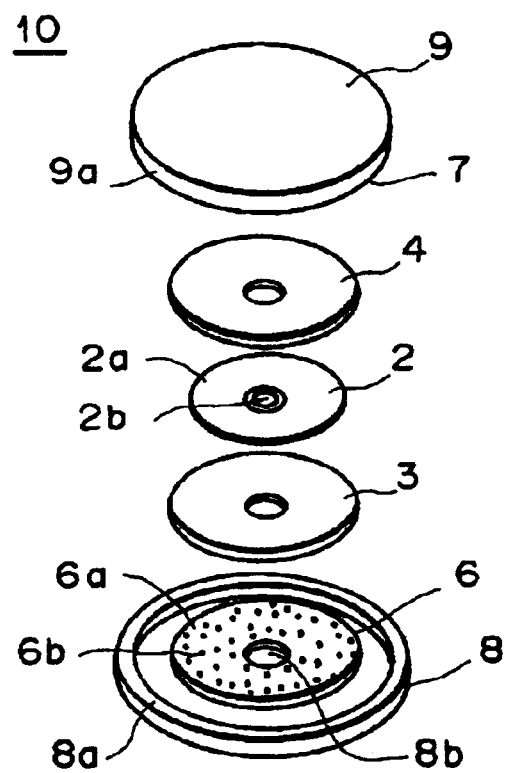
FIG. 6 is a drawing showing a breakdown of the conjoined body shown in FIG. 1.

Hereinafter a specific magnetic transfer method will be explained. FIG. 5 is a perspective view of the main sections of the magnetic transfer apparatus according to one of the embodiments of the present invention in the transfer state. FIG. 6 is an exploded perspective view of the conjoined body according to the first embodiment.

The magnetic transfer apparatus 1 shown in FIGS. 5 and 6 is a magnetic transfer apparatus that performs double sided simultaneous transfer: the master mediums 3 and 4 are brought into close contact under pressure with the upper and lower recording surfaces of the slave medium 2, respectively, to form a conjoined body 10; while said conjoined body 10 is being rotated a transfer magnetic field is applied thereto by an electromagnetic apparatus 5 (a magnetic field producing apparatus) disposed above and below the conjoined body 10; whereby the data born on the master mediums 3 and 4 is transferred to both the respective upper and lower face of the slave medium 2 concurrently.

The conjoined body 10 comprises a lower-face master medium 3 for transferring data such as a servo signal or other data to the lower recording surface of the slave medium 2; an upper-face master medium 4 for transferring data such as a servo signal or other data to the upper recording surface of the slave medium 2; a lower-face pressure conjoining member 8 provided with a lower face leveling element 6 for adsorbing the lower-face master medium 3 and correcting the flatness thereof; an upper-face pressure conjoining member 9 provided with an upper face leveling element 7 (of the same configuration as the lower face leveling element 6) for adsorbing the upper-face master medium 4 and correcting the flatness thereof; pressure is applied to these while in the state in which the respective center portions thereof have been matched, and the lower-face master medium 3 and the upper-face master medium 4 are brought into close contact with the respective upper and lower recording surfaces of the slave medium 2.

The face of the lower-face master medium 3 and the upper-face master medium 4 opposite the face thereof on which the micro uneven pattern has been formed are vacuum adsorbed by the lower face leveling element 6 and the upper face leveling element 7, respectively. When necessary, in order to improve the contact characteristics between the slave medium 2 and the lower-face master medium 3 and the upper-face master medium 4, fine pores are provided at positions other than those on which the micro uneven pattern has been formed and on positions not communicating with the suction pores (described below) of the lower face leveling element 6 and the upper face leveling element 7 so as to penetrate through the front and back surfaces thereof; the air between the close contact surfaces of the slave medium 2 and the surface of the respective master medium is suctioned out and expelled. At this time, because the air between the slave medium 2 and the contours of the uneven pattern such as that described above formed on the master medium according to the present invention is completed suctioned out and expelled, the contact characteristics are extraordinarily good.

The lower face leveling element 6 (of the same configuration as the upper face leveling element 7) is provided in the form of a disk corresponding to the size of the master medium 3, and an adsorption surface 6a finished so as to have an average surface roughness of Rp 0.01–0.1 um at the center line thereof is provided on the surface thereof. This adsorption surface 6a is provided with approximately 25–100 suction pores having a diameter of 2 mm or less, and which are substantially uniform at the opening thereof. Although not shown in the drawing, these suction pores 6b are connected to a vacuum pump via a suction channel that extends from the interior portion of the lower face leveling element 6 to the exterior portion of the lower-face pressure conjoining member 8, which provides the suction thereof; the suction pores 6b adsorb, under the force of vacuum suction, the rear face of the master medium 3 that has been brought into close contact with the suction contact face 6a, and corrects the flatness of said master medium 3 so that said flatness parallels that of the suction contact face 6a.

The lower-face pressure conjoining member 8 and the upper-face pressure conjoining member 9 are opened and closed by an opening and closing mechanism (e.g., a pushing mechanism, a fastening mechanism) which is not shown in the drawing, and which is provided in the form of a disk that is movable in one or both of the axial directions thereof; these are conjoined by the mutual, predetermined pressure of each respective opening and closing mechanism. On the outer circumference of the lower-face pressure conjoining member 8 and the upper-face pressure conjoining member 9 are provided brim portions 8a and 9a, respectively; said brim portions 8a and 9a are brought into contact with each other when the closing operation is performed so as to maintain the inner portion in a tightly closed state. A pin 8b is formed on the center portion of the lower-face pressure conjoining member 8, which couples with the central aperture of the hub 2b of the slave medium 2 so as to align the positions thereof. Further, the lower-face pressure conjoining member 8 and the upper-face pressure conjoining member 9 are connected by a rotating mechanism (not shown) and are rotated thereby as an integral unit.

Because the magnetic transfer operation can be performed on a plurality of slave mediums using a single pair of a lower-face master medium 3 and an upper-face master medium 4, with regard to the conjoined body 10: the center positions of the respective suction contact faces 6a of the lower face leveling element 6 and the upper face leveling element 7 are matched and conjoined by vacuum adsorption to the lower-face master medium 3 and the upper-face master medium 4, respectively, and maintained in said conjoined state; and the setting and replacing of the slave medium is performed while the lower-face pressure conjoining member 8 and the upper-face pressure conjoining member 9 are in the separated state. After the center position of the slave medium 2, to which an initial magnetic field has been applied in advance in one direction of the track direction, is aligned, and said slave medium 2 is set, the lower-face pressure conjoining member 8 and the upper-face pressure conjoining member 9 are brought together and closed, whereby the master mediums 3 and 4 are brought into close contact with the respective recording surfaces of the slave medium 2. Then, by the movement of the upper and lower electromagnetic apparatuses 5 or the movement of the conjoined body 10, the upper and lower faces of the conjoined body 10 approach the respective upper and lower electromagnetic apparatuses 5. While said conjoined body 10 is being rotated, the transfer magnetic field Hdu is applied in the direction opposite that in which the initial magnetic field was applied to the slave medium 2. The data born on the surface of the uneven pattern of the lower face master medium 3 and the upper face master medium 4 is transferred to the respective recording surface of the slave medium 2 by the application of this transfer magnetic field.

If the master medium according to the present invention is used as described above, because there is no remaining air between the master and slave mediums, advantageous contact characteristics therebetween can be obtained, the occurrence of signal omissions when the magnetic transfer is performed can be prevented, and the quality of the transfer can be improved.

Note that here, although an explanation of an embodiment wherein the magnetic transfer has been performed concurrently for both recording surfaces of the slave medium, the transfer can also be performed sequentially, one recording surface at a time. Note that an effect whereby the position determination between the master and slave mediums is better is obtained by use of the single-face transfer.

A synthetic resin, a ceramic material, an alloy, aluminum, glass, quartz, silicon, nickel, or the like is used to form the substrate of the master medium. The uneven pattern can be formed by use of a stamping method, a photo fabrication method, or the like. It is preferable that the depth (the height of the protrusions) of the uneven pattern formed on the substrate be in the range of 80–800 nm; and more preferably, in the range of 150–600 nm. For cases in which this uneven pattern is that of a servo signal, said pattern is formed longer in the radial direction thereof. For example, it is preferable that the length in the radial direction be 0.05–20 um, and 0.05–5 um in the circumferential direction; it is preferable that a pattern of this type, in which the length in the radial direction is longer and within this range, is selected as the pattern for bearing servo signal data.

As to the material forming the pliable magnetic layer, Co, a Co alloy (CoNi, CoNiZr, CoNbTaZr, or the like), Fe, an Fe alloy (FeCo, FeCoNi, FeNiMo, FeAlSi, FeAl, FeTaN), Ni, a Ni alloy (NiFe), or the like can be employed therefor; it is particularly preferable that FeCo, or FeCoNi be employed. This pliable magnetic layer is formed of a magnetic material by use of a vacuum layer forming means such as a vacuum deposition method, a sputtering method, an ion platting method, or by a metal plating method, etc. It is preferable that the thickness of the pliable magnetic layer be in the range of 50–500 nm, and even more preferably, in the range of 100–400 nm.

Hereinafter a more detailed explanation of the manufacture of a master medium according to the present invention will be given. Here, the manufacture of a master medium on which the uneven pattern formed on the substrate thereof is formed by use of a stamping method will be explained.

First, a photoresist is formed on a glass (or quartz) substrate having a smooth, flat surface, by use of a spin coat process or the like. While this glass substrate is rotated, a laser beam (or an electron beam) modulated in correspondence to a servo signal is projected onto the surface thereof, and a predetermined pattern is exposed on the entire surface of the photoresist: for example, portions corresponding to each frame on the circumference corresponding to the pattern of a servo signal, which extends from the rotational center point of each track in the radial direction therefrom, are exposed; then, a photoresist development process is performed; the exposed portions of the photoresist are removed; and an original disk having an uneven pattern formed of photoresist is obtained. Next, the surface of the uneven pattern thus formed on the surface of the original disk is subjected to a plating process (electroforming), whereby a Ni substrate having a positive uneven pattern is formed; said Ni substrate is then peeled away from the original disk. This Ni substrate can be employed as a master plate as is, or after a non-magnetic layer, a pliable magnetic layer, or a protective layer has been further applied over the uneven pattern thereof. Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by impressing a synthetic resin into said disk and letting the resin harden; this third original disk can be metal platted to obtain a substrate having a positive uneven pattern.

Note that after the uneven pattern of photoresist has been formed on the glass substrate, etching can be performed to form holes in the glass substrate, whereby a substrate from which photoresist has been removed can be obtained; a substrate can be formed therefrom based on any of the methods described above.

Ni or a Ni alloy can be used as the material to form a metallic substrate, and any of various types of methods of forming a metallic layer, including electroless deposition methods, electroforming methods, sputtering methods, and ion plating methods can be employed as the plating method used to form this substrate. For cases in which the substrate is formed of Ni or other ferromagnetic material, it is possible to perform the magnetic transfer by only the substrate; however, by providing a layer having good transfer characteristics, a more favorable magnetic transfer can be performed. Further, for cases in which the substrate is formed of a non-magnetic material, it is necessary to provide a magnetic layer thereon.

This magnetic layer (pliable magnetic layer) is formed by a method of vacuum depositing, sputtering, or ion plating a magnetic material onto the surface of the substrate.

Note that as described above, it is preferable that a DLC or other type of protective layer is formed on the magnetic layer, and a lubricating layer can also be provided. Further, it is even more preferable that the protective layer be a 5–30 nm DLC film and that a lubricating layer is also provided. Also, a contact enhancing layer formed of Si or the like can also be provided.

A resin substrate can also be formed utilizing the aforementioned original disk, and a magnetic layer can be formed thereon and the resulting product used as a master medium. As to the resin material used to form the resin substrate, it is possible to use an acrylic resin such as polycarbonate or polymethylmethacrylate (PMMA), a chlorinated vinyl resin such as polychlorinated vinyl or copolymerized chlorinated vinyl, an epoxy resin, an amorphous polyolefin, a polyester, or the like. From the point of view of lubricity, dimensional stability, cost, and the like, it is preferable that polycarbonate be used as said resin material. For cases in which there are burrs or the like adhered to the surface of a formed substrate, said burrs or the like is removed by use of a varnish or a polish. It is preferable that the height of the protrusions of the pattern formed on a resin substrate are in the 50–1000 nm range; more preferably, in the 200–500 nm range.

A magnetic layer is coated over the micro uneven pattern formed on the surface of the resin substrate to obtain a master medium. Note that the magnetic layer is formed by use of a vacuum film forming means employing a vacuum deposition method, a sputtering method, an ion platting method or the like, or by use of a plating method.

Next, a detailed explanation will be provided of an embodiment of a master medium according to the present invention wherein a rough surface has been formed on the surface of the protrusion portions of the uneven pattern. FIGS. 7–11 are drawings each showing a cross-section of a portion of a master medium according to the third through seventh embodiments of the present invention, respectively. The substrate of the master mediums according to the third through sixth embodiments of the present invention shown in FIGS. 7–10 is a substrate on which an uneven pattern has been formed on the surface thereof, and this substrate has been obtained by use of, for example, the stamping method described above.

Figure 7:
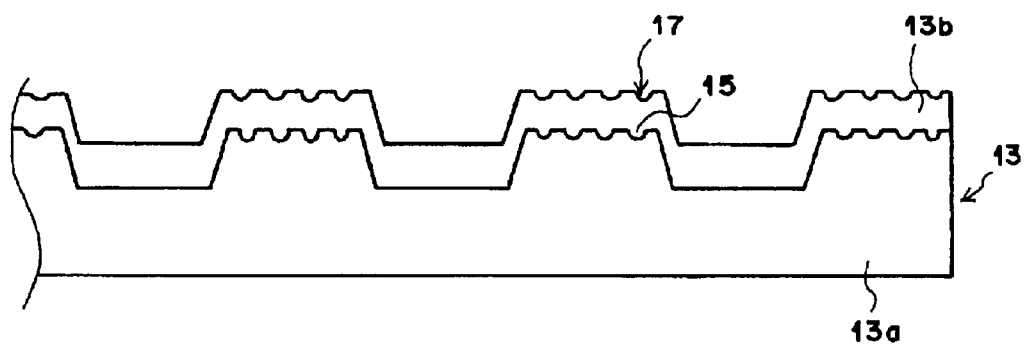
FIG. 7 is a cross-sectional drawing of a portion of the master medium of the third embodiment of the present invention.

According to the master medium 13 of the third embodiment shown in FIG. 7: the surface of the protrusion portions of the uneven pattern that has been formed on the substrate 13a is textured by use of a grinding process or a laser, whereby micro depressions and protrusions 15 are formed thereon; and a pliable magnetic layer 13b is formed on said surface having the micro depressions and protrusions 15. That is to say, the pliable magnetic layer 13b provided on the surface of the protrusions of substrate 13a having the micro depressions and protrusions 15 has an uneven surface (a rough surface) corresponding to said micro depressions and protrusions 15.

Figure 8:
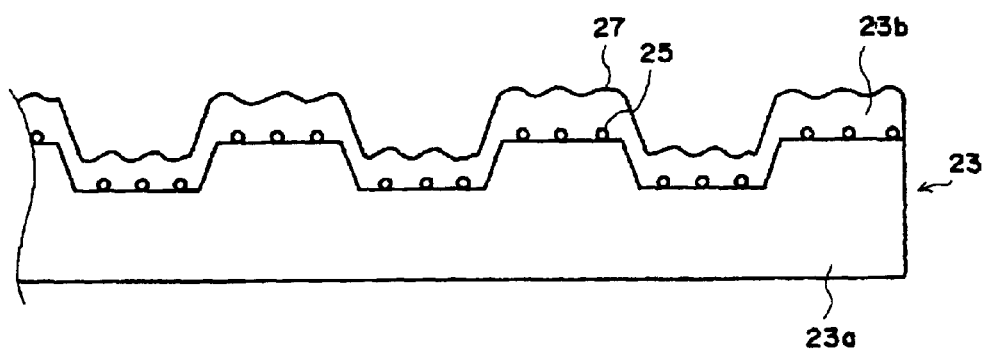
FIG. 8 is a drawing of a cross-section of a portion of the master medium of the fourth embodiment of the present invention.

According to the master medium 23 of the fourth embodiment shown in FIG. 8: a layer of granular material 25, such as $SiO_2$ or the like, is coated onto the surface of the uneven pattern that has been formed on the substrate 23a; and a pliable magnetic layer 23b is formed over the surface of said granular material 25. That is to say, an uneven surface (a rough surface) 27 corresponding to the surface of the granular material 25 coated on the substrate 23a is formed on the surface of the pliable magnetic layer 23b.

Figure 9:
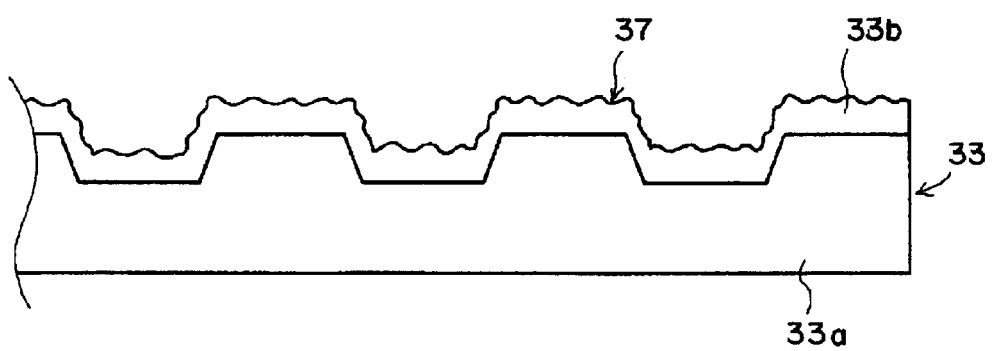
FIG. 9 is a drawing of a cross-section of a portion of the master medium of the fifth embodiment of the present invention.

According to the master medium 33 of the fifth embodiment shown in FIG. 9: a pliable magnetic layer 33b is formed, by use of a sputtering process or the like, on the surface of the uneven pattern that has been formed on the substrate 33a; however, by changing the conditions under which said pliable magnetic layer 33b is formed by use of a sputtering process or the like, the roughness of the surface thereof can be controlled, whereby a rough surface 37 can be formed on the surface of the uneven pattern by this surface roughness.

According to the master medium 43 of the sixth embodiment shown in FIG. 10: a layer of porous material 4 is formed on the surface of the uneven pattern that has been formed on the substrate 43a; and a pliable magnetic layer 43b is formed over the surface of said porous material 25. That is to say, a rough surface 47 corresponding to the surface form 45 of said porous material 44 is formed on the surface of the pliable magnetic layer 43b provided over the layer of porous material 44. It is desirable that the volume ratio of this porous material 44 is 30–99%, and that the surface roughness thereof is in the range of Rp 0.0001–0.1.

Note that this film of porous material can be a film formed on the substrate of a material differing therefrom; alternatively, the material of which the uneven pattern that has been formed on the surface of the substrate, such as nickel, silicon, quartz, glass, aluminum, an alloy, ceramics, a synthetic resin, or the like, can be subjected to a process that causes the surface said uneven pattern to become porous.

As to the method of causing the surface of the uneven pattern to become porous, it is possible to employ a sintering method or a casting method; however, in order to form more microscopic depressions and protrusions, it is recommended that an electrical or chemical deposition method be applied to the molded surface, and that said surface be subjected to a wash with a liquid polymer or the like and then subjected to an etching process.

Figure 11:
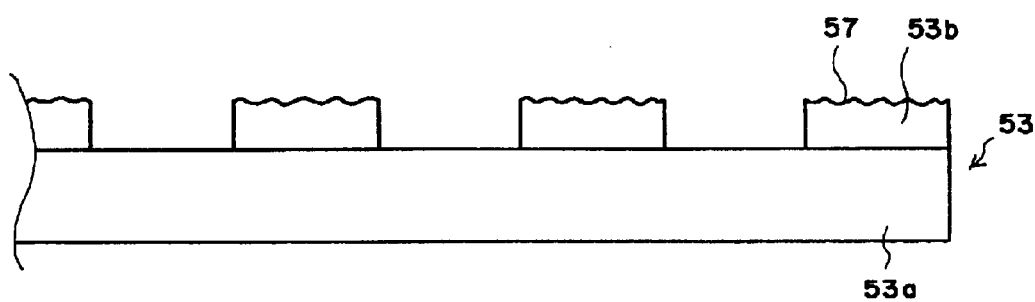
FIG. 11 is a drawing of a cross-section of a portion of the master medium of the seventh embodiment of the present invention.

According to the master medium 53 of the seventh embodiment shown in FIG. 11: an uneven pattern, which is formed by a pliable magnetic layer, is formed on a flat substrate 53a. In this manner, the uneven pattern of the master medium can be formed of the pliable magnetic layer 53b. According to this master medium 53: a pliable magnetic layer 53b having a rough surface 57 is formed on the substrate 53a under appropriate film forming conditions, in the same manner as occurred in the third embodiment described above; then, the uneven pattern is formed by use of, for example, a photo fabrication method. Note that in order to form the rough surface, in the same manner as occurs in the case of the master medium according to the third, fourth, or sixth embodiments, the rough surface of the substrate can be subjected to a texturing process, a coat of granular material can be provided between the substrate and the pliable magnetic layer, or a porous film can be provided between the substrate and the pliable magnetic layer, etc.

According to each of the embodiments described above, for cases in which the rough surface of the uneven pattern is formed of depression portions and protrusion portions, it is desirable that the depth of the depression portions of the rough surface be in the range of 3–50 nm; and more preferably, in the 5–20 nm range.

Further, according to the master medium of each of the embodiments described above, a protective layer can be provided over the pliable magnetic layer. For cases in which a protective layer is provided over the pliable magnetic layer, a rough surface is formed on the surface of the protective layer, which is the topmost layer, corresponding to the surface of the rough surface of the pliable magnetic layer; as a result, a master medium having a rough surface on at least the surface of the protrusion portions of the uneven pattern can be obtained.

If a magnetic transfer is performed using a master medium of any of the above-described embodiments according to the present invention: because a rough surface has been provided on the surface of the uneven pattern, the actual contact surface area between the master medium and the slave medium when the positions thereof are being matched is smaller than that of conventional master mediums; whereby the friction coefficient therebetween is reduced, and the wear-out time of the uneven pattern of the master medium can be extended; favorable contact characteristics, wherein it is possible to easily expel the air between the respective surfaces of the master and slave mediums when said surfaces are brought into close contact; and it becomes possible to easily separate the master and the slave medium after a magnetic transfer has been performed. Accordingly, the life span of the master medium can be lengthened, and a more favorable magnetic transfer can be performed.

Figure 12A:
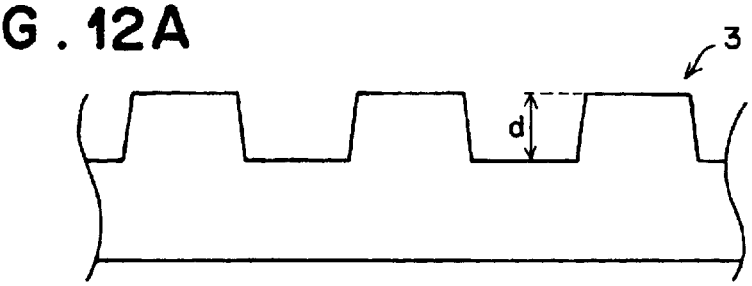
FIGS. 12A, 12B, and 12C are drawings illustrating the method of using the master medium of one of the embodiments of the present invention.
Figure 12B:
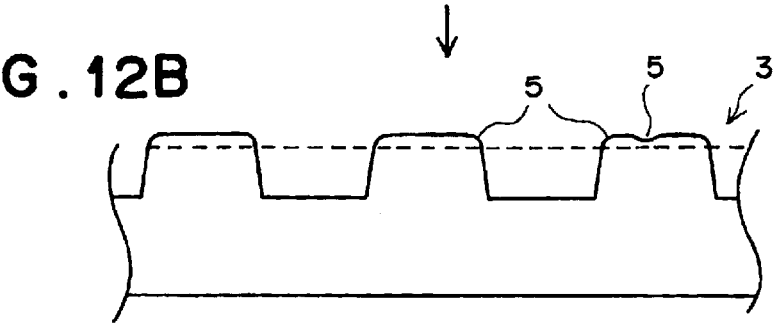
Figure 12C:
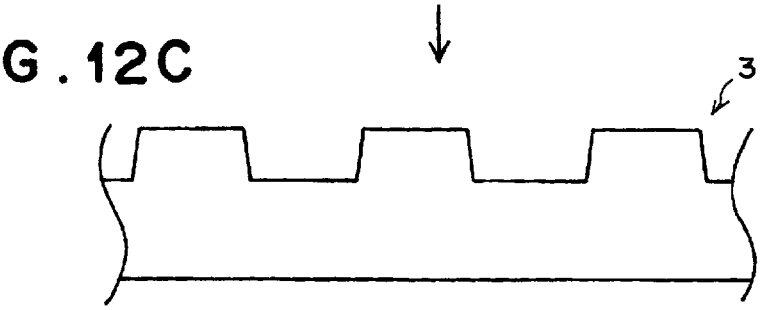

Next, the method of using the master mediums according to the present invention will be explained with reference to FIGS. 12A, 12B, and 12C. FIG. 12A is a cross-sectional drawing of a portion of a master medium in the state immediately after the manufacture thereof. FIG. 12B is a cross-sectional drawing of a portion of a master medium that has been subjected to repeated usage, whereby the surface thereof has become marred. FIG. 12C is a cross-sectional drawing of a portion of the master medium shown in FIG. 12B after being subjected to a grinding process and in the state in which reuse thereof is possible.

As shown in FIG. 12A, the depth d of the uneven pattern of the master medium 3 is formed in the range of 50–1000 nm. Using this master medium 3, a magnetic transfer of the type shown in FIG. 1 and explained thereby is performed. During the course of performing the magnetic transfer on a plurality of slave mediums, as shown in FIG. 12B, the surface of the uneven pattern of the master medium 3 becomes marred with marks 5 due to friction generated between said surface and the respective surface of the slave medium when the positions thereof are matched, or due to dust or other foreign matter that has adhered to said surface of said uneven pattern. If a master medium which is marred in this manner, or of which the angles of the master medium become rounded or protrude, is employed to perform a magnetic transfer, the transfer accuracy becomes extraordinarily unfavorable. In the past, when a master medium has come to be in this marred, etc., state, said master medium has been replaced with a new master medium.

Therefore, according to the method of using the master medium of the present invention, by grinding the surface of an uneven pattern that has become marred, the master medium 3 can be reused. The surface of the protrusion portions of the master medium that has become marred with the marks 5 at the sections shown in FIG. 12B is ground to the extent required to remove said marks 5 (to the vicinity of the position shown by the dotted line in FIG. 12).

A master medium on which the surface of the protrusion portions of the uneven pattern is favorable, as shown in FIG. 12C, is thereby reproduced, and can be reused. Although the depth of the depression portions of the uneven patter is reduced by the grinding, it is possible to repeatedly use this master medium until this depth is in the range of 5–10 nm. However, because the lower limit of the depth of the uneven pattern depends on the width in the direction of the track, no overall definition thereof can be provided.

In this manner, by grinding the surface of the protrusion portions of the uneven pattern and reusing the master medium, the life span of the master medium can be lengthened, whereby it becomes possible to perform the magnetic transfer to a larger number of slave mediums. Note that the grinding of the surface of the protrusion portions of the uneven pattern can be performed regularly based on an experientially determined extent to which the surface of the protrusion portions has become marred, according to the number of times or a period during which the medium has been used, or based on the results of regular inspections of the surface form of the surface of said protrusion portions, as required.

Note that for a master medium that has been provided with a magnetic layer, a protective layer, or the like on the top layer thereof, because these upper layers are shaved off by the grinding, the films must be reformed. However, compared to the case in which the master medium is formed from a substrate, the cost and trouble incurred thereby can be reduced.

Note that although according to a method of using the master mediums described above, although the master mediums that have become marred after usage thereof have been restored and reused, even in the state after production and before having been used, the surface of the protrusion portions of the uneven pattern can become marred during the manufacturing process, or during storage and handling; there are cases in which this results in a deterioration of the accuracy of the magnetic transfer. According to another method of using the master mediums according to the present invention: the surface of the protrusion portions of the uneven pattern is ground after the manufacture and before the use thereof to obtain a favorable surface state; that is, even for cases such as those described above wherein said surface is damaged even though said master medium is in the state after manufacture and before the use thereof, the marks can be removed by the grinding process and the condition of the surface made favorable, whereby it becomes possible to perform favorable magnetic transfers. Further, by again grinding the surface of the protrusion portions of the uneven pattern and reusing the master medium, it becomes possible to perform the magnetic transfer to a larger number of slave mediums.

What is claimed is:

1. A magnetic transfer master medium provided with an uneven surface for transferring data to a slave medium, wherein said uneven pattern surface is formed so that there are no depression portions therein that are completely surrounded by protrusion portions, wherein the width of the protrusion portions of the uneven surface in a direction of a track pitch is formed to be narrower than a track width.

2. A magnetic transfer master medium provided with an uneven surface for transferring data to a slave medium, wherein said uneven pattern surface is formed so that there are no depression portions therein that are completely surrounded by protrusion portions, wherein at least one protrusion portion formed within a single track is formed so that the width thereof in a direction of a track pitch is narrower than a track width, and at least one protrusion portion formed straddling two adjacent tracks is formed so that the width of the straddling protrusion portion in the direction of the track pitch is substantially equal to said track width.

3. A magnetic transfer master medium provided with an uneven surface for transferring data to a slave medium, said magnetic master medium comprising:

a substrate;

an uneven surface provided on a surface of said substrate;

a film of porous material formed on at least one section of a protrusion portion of said uneven surface, wherein the film of porous material has a surface roughness in the range of Rp=0.0001 to 0.1; and a pliable magnetic layer formed on said film of porous material wherein a rough surface is formed on the surface of at least one protrusion portion of the uneven surface of the magnetic transfer master medium, and said rough surface is formed according to a surface form of the film of porous material.

4. A magnetic transfer master medium as defined in claim 3, wherein said rough surface corresponds to a rough surface formed by a surfacing process on the at least one section of the substrate on which the pliable magnetic layer has been formed.

5. A magnetic transfer master medium as defined in claim 3, further comprising:

a granular material coated onto at least one section of the surface of said uneven surface constituting the protrusion portions of said uneven surface; and a pliable magnetic layer formed over said granular material, wherein said rough surface is formed according to the surface form of the protrusion portions that have been coated with said granular material.

6. A magnetic transfer master medium as defined in claim 3, wherein said rough surface is formed as a surface roughness, the formation of which is controlled by the formation conditions of the pliable magnetic layer.

7. A magnetic transfer master medium
provided with an uneven surface for transferring data to a slave medium, said magnetic master medium comprising:

a substrate;

an uneven surface provided on a surface of said substrate;

a film of porous material formed on at least one section of a protrusion portion of said uneven surface, wherein the film of porous material has a volume ratio in the range of 30–99%; and a pliable magnetic layer formed on said film of porous material.

wherein a rough surface is formed on the surface of at least one protrusion portion of the uneven surface of the magnetic transfer master medium, and said rough surface is formed according to a surface form of the film of porous material.

8. A magnetic transfer master medium as defined in claim 3, wherein the rough surface is an uneven surface having depression portions of a depth in the range of 3–50 nm.

9. A magnetic transfer master medium as claimed in claim 3 wherein channels of the uneven surface have a depth in a range of 50–1000 nm, and the surface of protrusion portions is ground at least once after the manufacture of the magnetic transfer master medium.

10. A magnetic transfer master medium as claimed in claim 3 wherein channels of the uneven surface have a depth in a range of 50–1000 nm after the manufacture, and the surface of the protrusion portions is ground at least once after said medium has been used.

11. A magnetic recording medium comprising:

a magnetic transfer master medium comprising an uneven pattern formed on a face of said master medium, said master medium being operable to transfer data to a slave medium, wherein the uneven pattern comprises depression portions all of which are at least partially open to adjacent protrusion portions and a width of the protrusion portions in a direction of a track pitch is formed to be narrower than a track width.

* * * * *